(12) United States Patent
Brandl et al.

(10) Patent No.: US 9,969,330 B2
(45) Date of Patent: May 15, 2018

(54) MIRROR SUBSTITUTE DEVICE AND VEHICLE

(71) Applicant: Conti Temic microelectronic GmbH, Nuremberg (DE)

(72) Inventors: Juergen Brandl, Langenargen (DE); Wolfgang Fey, Bodolz (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days. days.

(21) Appl. No.: 14/392,233

(22) PCT Filed: May 27, 2014

(86) PCT No.: PCT/DE2014/200234
§ 371 (c)(1),
(2) Date: Dec. 23, 2015

(87) PCT Pub. No.: WO2014/206406
PCT Pub. Date: Dec. 31, 2014

(65) Prior Publication Data
US 2016/0288710 A1 Oct. 6, 2016

(30) Foreign Application Priority Data
Jun. 26, 2013 (DE) .......... 10 2013 106 701

(51) Int. Cl.
*B60R 1/00* (2006.01)
*G06K 9/00* (2006.01)

(52) U.S. Cl.
CPC ............ *B60R 1/00* (2013.01); *G06K 9/00791* (2013.01); *B60R 2300/105* (2013.01);
(Continued)

(58) Field of Classification Search
CPC .............................. B60R 1/00; G06K 9/00791
(Continued)

(56) References Cited

U.S. PATENT DOCUMENTS 4,279,328 A  7/1981  Ahlbom
5,102,089 A  4/1992  Baur
(Continued)

FOREIGN PATENT DOCUMENTS

DE  199 36 578  3/2001
DE  100 37 128  5/2001
(Continued)

OTHER PUBLICATIONS

PCT, International Search Report of the International Searching Authority for International Application PCT/DE2014/200234, dated Oct. 6, 2014, 2 pages, European Patent Office, HV Rijswijk, Netherlands.
(Continued)

*Primary Examiner* — Mishawn Hunter
(74) *Attorney, Agent, or Firm* — W. F. Fasse

(57) ABSTRACT

A mirror substitute device for a vehicle has at least one camera designed to cover at least a part of the surroundings of the vehicle and to provide a corresponding image signal, an image processing device coupled to the camera and designed to process the image signal and to output a processed image signal, and at least one display device designed to display the processed image signal.

14 Claims, 2 Drawing Sheets

(52) U.S. Cl.
CPC ..... *B60R 2300/30* (2013.01); *B60R 2300/307* (2013.01); *B60R 2300/70* (2013.01); *B60R 2300/802* (2013.01); *B60R 2300/804* (2013.01); *B60R 2300/8046* (2013.01)

(58) Field of Classification Search
USPC .................................. 348/148, 149; 382/103
See application file for complete search history.

(56) References Cited

U.S. PATENT DOCUMENTS

| | | | |
|---|---|---|---|
| 5,119,241 | A | 6/1992 | Rutten |
| 6,930,592 | B2 | 8/2005 | Schlecht et al. |
| 8,947,532 | B2 | 2/2015 | Augst |
| 9,001,204 | B2 | 4/2015 | Fukuda |
| 9,834,143 | B2 * | 12/2017 | Zhang .................... B60R 1/002 |
| 2005/0238203 | A1 * | 10/2005 | Yoshimura ............. B60Q 9/005 382/104 |
| 2005/0264099 | A1 | 12/2005 | Kamiya et al. |
| 2006/0164230 | A1 * | 7/2006 | DeWind ................. B60K 35/00 340/461 |
| 2006/0178787 | A1 * | 8/2006 | McCall .................. B60R 1/002 701/1 |
| 2006/0287826 | A1 * | 12/2006 | Shimizu ................. B60K 35/00 701/431 |
| 2008/0007428 | A1 | 1/2008 | Watanabe et al. |
| 2008/0077882 | A1 * | 3/2008 | Kramer .................. B60K 35/00 715/810 |
| 2008/0231701 | A1 | 9/2008 | Greenwood et al. |
| 2009/0091436 | A1 | 4/2009 | Anderson |
| 2009/0102921 | A1 | 4/2009 | Ito et al. |
| 2010/0060487 | A1 | 3/2010 | Augst |
| 2010/0070139 | A1 * | 3/2010 | Ohshima ................... B60R 1/00 701/42 |
| 2012/0229639 | A1 | 9/2012 | Singleton |
| 2013/0054086 | A1 * | 2/2013 | Lo ............................ B60R 1/00 701/36 |
| 2013/0076007 | A1 | 3/2013 | Goode et al. |
| 2013/0322692 | A1 * | 12/2013 | Guan ................ G06K 9/00791 382/103 |
| 2015/0022665 | A1 * | 1/2015 | Lu ............................ B60R 1/00 348/148 |
| 2016/0167583 | A1 | 6/2016 | Schrepfer |
| 2016/0314357 | A1 | 10/2016 | Fey et al. |

FOREIGN PATENT DOCUMENTS

| | | |
|---|---|---|
| DE | 102005045195 | 4/2006 |
| DE | 102006036933 | 2/2008 |
| DE | 102006037600 | 2/2008 |
| DE | 102007032527 | 2/2008 |
| DE | 102008030104 | 2/2009 |
| DE | 102008046214 | 4/2009 |
| DE | 102006037600 B4 | 3/2010 |
| DE | 102008045436 | 3/2010 |
| DE | 102009032542 | 1/2011 |
| DE | 102010026222 | 5/2011 |
| DE | 102009057837 | 6/2011 |
| DE | 102011077143 | 12/2012 |
| DE | 102012010126 | 12/2012 |
| DE | 102011113197 | 3/2013 |
| EP | 0 835 796 | 4/1998 |
| EP | 1 158 473 | 11/2001 |
| EP | 2 028 632 | 2/2009 |
| EP | 2 312 497 | 4/2011 |
| EP | 2 431 227 | 3/2012 |
| JP | 05-052712 U | 7/1993 |
| JP | 2004-001658 A | 1/2004 |
| JP | 2007-266930 A | 10/2007 |
| JP | 2008-015759 A | 1/2008 |
| JP | 2011-015353 A | 1/2011 |
| JP | 2011-114467 A | 6/2011 |
| JP | 2012-066700 A | 4/2012 |
| JP | 2012-113605 A | 6/2012 |
| KR | 20120044752 * | 5/2012 |
| KR | 20120115716 * | 10/2012 |
| WO | WO 2011/085489 | 7/2011 |
| WO | WO 2013/009697 | 1/2013 |

OTHER PUBLICATIONS

PCT, English Translation of PCT International Preliminary Report on Patentability of the International Searching Authority for International Application PCT/DE2014/200234, dated Dec. 30, 2015, 5 pages, International Bureau of WIPO, Geneva, Switzerland.

Partial English translation of Japanese Office Action in Japanese Patent Application No. 2016-522274, dated Jan. 10, 2018, 4 pages.

* cited by examiner

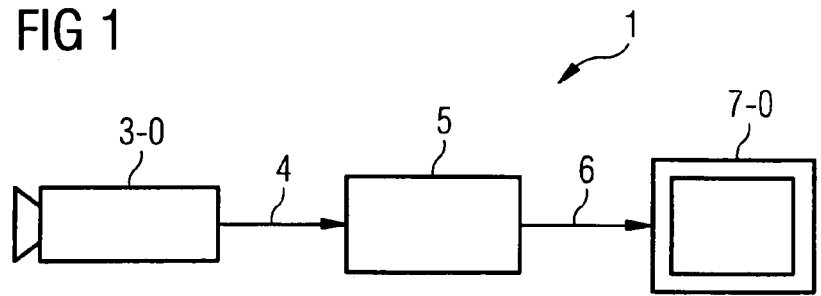
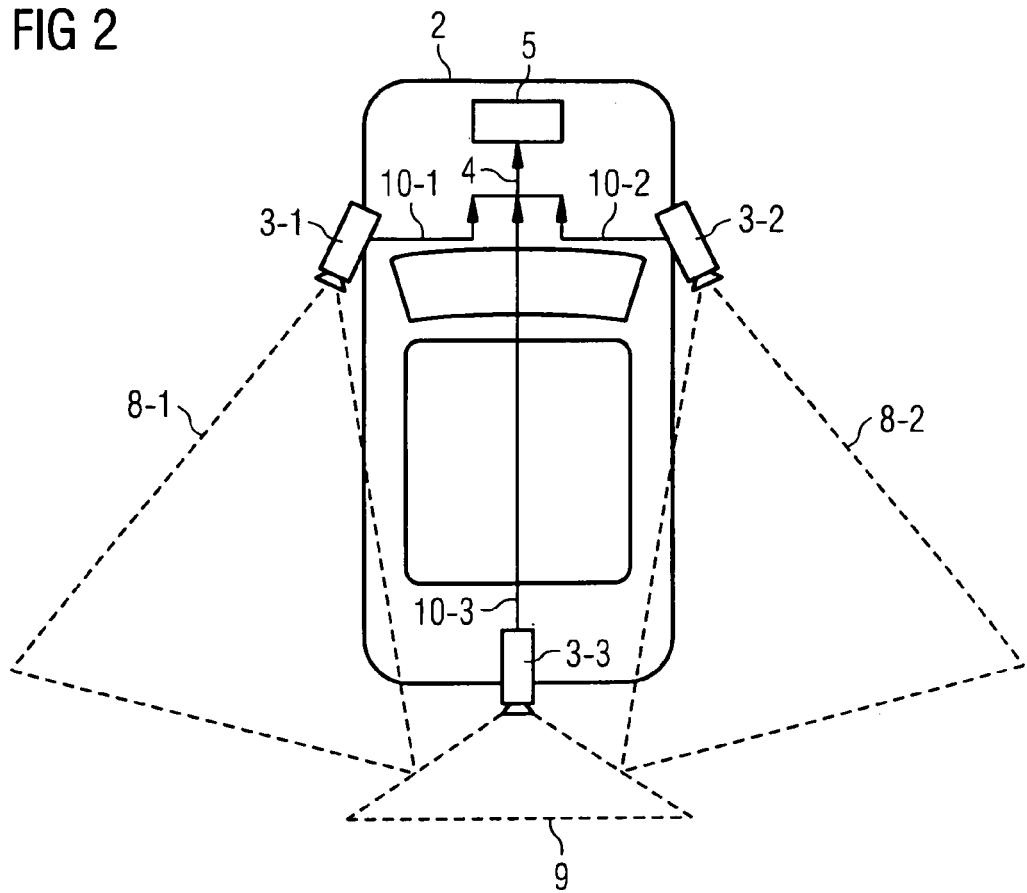

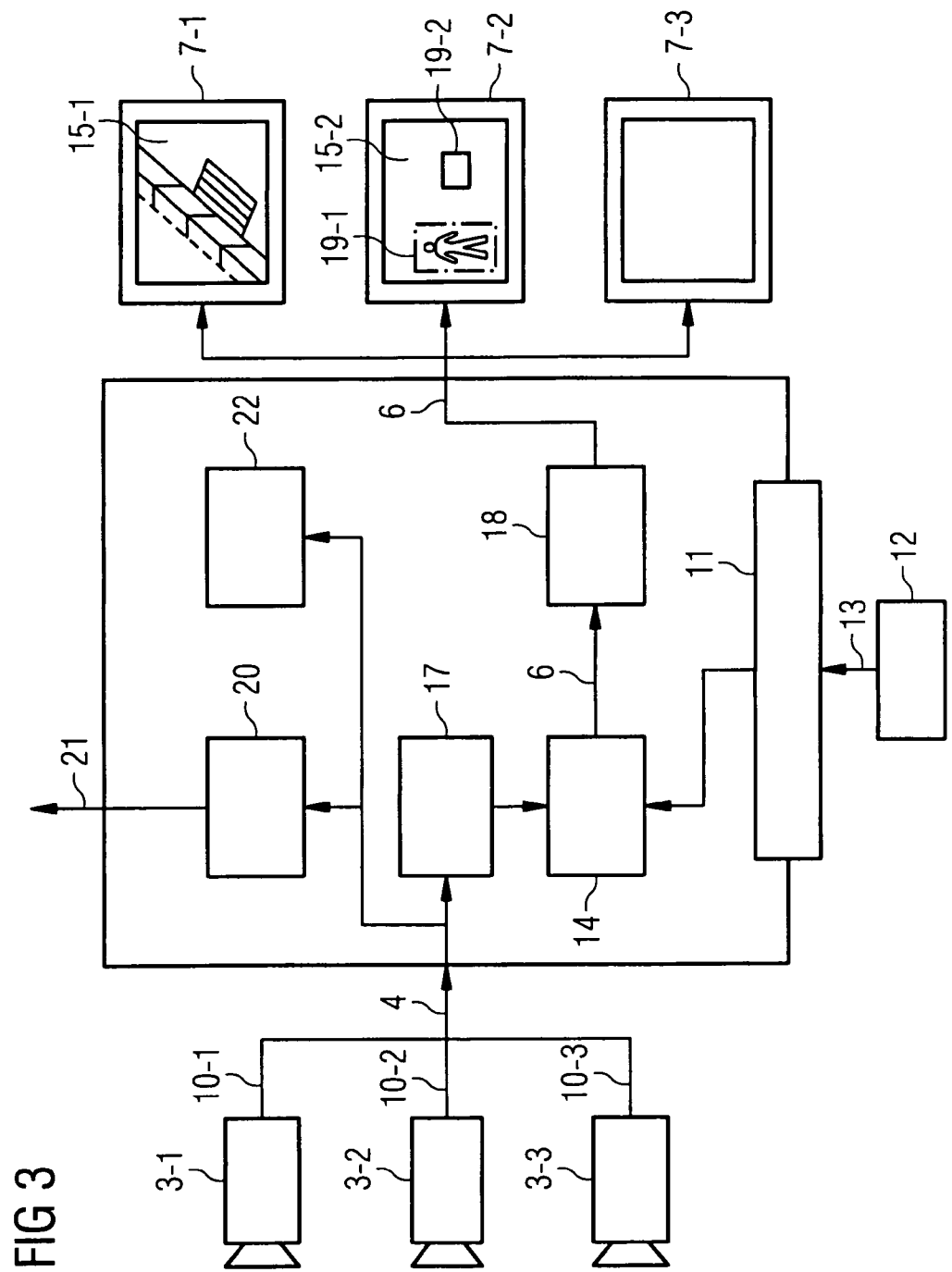

MIRROR SUBSTITUTE DEVICE AND VEHICLE

FIELD OF THE INVENTION

The present invention relates to a mirror substitute device and a corresponding vehicle.

BACKGROUND INFORMATION

Nowadays, in vehicles, an image of that region of the surroundings of the vehicle which is behind the vehicle is presented to the driver of the respective vehicle so that the or she can adapt his or her driving behavior to the surroundings of the vehicle.

In particular, an image of the lateral and/or rear regions of the surroundings of the vehicle (relevant visual range to be observed by the driver) is presented in the vehicle to the driver by means of mirrors. For this purpose, the well-known lateral rear view mirrors and inside rear view mirrors/outside mirrors and inside mirrors are normally used.

Here, the mirrors can be adjusted manually and/or electromechanically in many cases. Moreover, enlarged images, reduced images or special image details can be presented to the driver by means of various curvatures of the mirror surface, e.g., for the purpose of covering so-called blind spots.

With usual mirrors, a strong light source behind the vehicle (e.g., low sun or an approaching vehicle with poorly adjusted headlights) may dazzle the driver via the mirror.

It is a known fact that the dazzling effect of the mirrors can be adjusted in order to avoid said dazzling. For example, a mirror may be provided with an LCD layer that dims the mirror surface in order to prevent the driver from being dazzled via the mirrors.

It is also a known fact that with special vehicles, e.g., commercial vehicles or trucks, several mirrors are used in order to cover a corresponding visual range that enables the driver of the respective vehicle to observe the relevant surroundings of the vehicle.

With vehicle mirror arrangements normally used nowadays, adjusting options are limited, and it is impossible to provide an optimal representation of the surroundings of the vehicle for the driver in some driving situations.

SUMMARY OF THE INVENTION

It is therefore an object of the present invention to give the driver of a vehicle a better view of the surroundings of the vehicle.

Accordingly, there is provided:

A mirror substitute device for a vehicle, with at least one camera designed to cover at least a part of the surroundings of a vehicle and to provide a corresponding image signal; with an image processing device coupled to the camera and designed to process the image signal of the at least one camera and to output a processed image signal; and with at least one display device designed to display the processed image signal.

There is also provided:

A vehicle with an inventive mirror substitute device.

The finding on which the present invention is based consists in the fact that a mechanical mirror arrangement is not very flexible.

The idea on which the present invention is based consists in taking this finding into account and providing a device that substitutes for such a mechanical mirror and substitutes a flexible electronic system for it.

For this purpose, an embodiment of the present invention discloses a mirror substitute device that covers the surroundings of a vehicle by means of at least one camera and outputs an image signal showing said covered surroundings, after the processing of the image signal by an image processing device, and displays the image signal on a display device.

Thus, the present invention makes a very flexible design of the mirror substitute device possible since the cameras as well as the display device may be arranged in/on the vehicle very flexibly.

Furthermore, the image processing device may be integrated into the camera or the display device. The image processing device may also be integrated into, e.g., a control device that is already present in the vehicle.

Finally, the image processing device enables different processing steps to be applied to the image signal, and thus the representation of the surroundings of the vehicle to be adapted to different requirements.

In one embodiment, the at least one camera is designed to cover at least the lateral and/or rear regions of the surroundings of the vehicle. This enables the lateral rear view mirrors and inside rear view mirrors (by means of which the driver can observe the lateral and rear regions of the surroundings of the vehicle) normally used in vehicles nowadays to be substituted for by means of the inventive mirror substitute device.

In one embodiment, the mirror substitute device has a plurality of cameras designed such that camera image signals acquired by the respective cameras complement each other and form the image signal, thereby enabling a coherent image of the surroundings to be acquired and to be created even in situations in which this cannot be realized (e.g., for reasons of geometry) by one camera. Finally, a respective image detail may be selected from this complex image.

In one embodiment, the image processing device has a communication interface designed to obtain from a vehicle system of the vehicle at least data about the direction of motion of the vehicle and the speed of the vehicle, which enables particular triggers to be defined in the image processing device. On the basis of the values obtained from the vehicle system, said triggers start/end image processing in the image processing device or trigger a switch between two types of image processing.

In one embodiment, the image processing device has a selection device designed to select an image detail from the image signal and to output the selected image detail as the processed image signal, which enables image details relevant to the driver to be selected from the image signal and to be displayed to the driver, e.g., depending on the respective driving situation.

In one embodiment, the selection device is designed to select, when the vehicle is moving forward, an image detail that approximately corresponds to the image detail theoretically shown by an inside rear view mirror and/or lateral rear view mirror in the vehicle, which enables conventional inside rear view mirrors/lateral rear view mirrors of a vehicle to be substituted for in a simple manner.

In one embodiment, the at least one camera is designed to cover the blind spot of the vehicle. In addition, the selection device is designed to select that image detail which corresponds to the blind spot of the vehicle, thereby enabling the driver to also see a part of the surroundings of the vehicle which is not shown by a normal mirror. Furthermore, this region can be presented to the driver on a display device where the driver has, depending on the position of the display device, a better view of this region than he or she would have on a corresponding lateral rear view mirror.

In one embodiment, the selection device is designed to select and/or mark, when the vehicle is moving backward at a speed below a first speed threshold value, an image detail that shows the ground and/or the curbstone in the surroundings of the vehicle, which makes shunting and getting into a parking space in the reverse gear easier for the driver of the vehicle.

In one embodiment, the selection device is designed to select, when the vehicle is loaded and/or is cornering and/or is moving uphill or downhill, an image detail that shows the road behind the vehicle, thereby enabling the driver to observe, without constantly readjusting, e.g., a conventional mirror, the road behind the vehicle even in situations in which the angle of view with respect to the road changes.

In one embodiment, the selection device is designed to select more than one image detail and to combine the selected image details in the processed image signal, which provides the possibility of, e.g., displaying an image detail that shows that region of the surroundings which is behind the vehicle as well as an image detail that shows the blind spot of the vehicle, wherein the image details may simply be displayed next to each other. Alternatively, the transitions between the image details may be represented by, e.g., a distortion of the image, thereby enabling the selected image details to be joined without any transitions.

In one embodiment, the image processing device has an image editing device designed to change, particularly to normalize, the brightness of at least one detail of the image signal.

In one embodiment, the image processing device has an image editing device designed to change, particularly to increase, the contrast of at least one detail of the image signal.

In one embodiment, the image processing device has an image editing device designed to change the coloration of at least one detail of the image signal.

By changing the brightness, the contrast or the coloration of image signal details, details relevant to the driver of the vehicle may be highlighted, thereby enabling the driver to see such relevant details better. For example, the image may be colored at night such that the driver can see objects better. As a further example, the brightness of very bright objects or light sources may be reduced so that the remaining part of the image detail can be seen better.

In one embodiment, the image processing device has an image editing device designed to stabilize the contents of the image signal, which makes displaying a quiet image possible even when the vehicle is moving jerkily, thereby enabling the displayed image detail to be seen better.

In one embodiment, the image processing device has an object detection device designed to detect objects in the image signal and to mark at least one detected object in the image signal.

In one embodiment, the object detection device is designed to mark an object by boxing it in and/or coloring it with a predetermined color and/or zooming in on the object.

This enables the driver's attention to be specifically directed to objects. For example, an object, e.g., another vehicle the driver is approaching, may be highlighted/marked before the vehicles collide.

In one embodiment, the image processing device has a calculating device designed to generate a warning signal on the basis of the image signal when the vehicle is on the point of deviating from the traffic lane and/or when an object is in a blind spot of the vehicle and/or when an object is approaching the vehicle from behind, thereby enabling the mirror substitute device to provide additional functionalities in the vehicle. For example, the mirror substitute device may be used as a lane change assistance system or a lane departure warning system or the like.

In one embodiment, the image processing device has a storage device designed to store the image signal, which makes a reconstruction of events possible, e.g., after an accident.

Any desired combination of the above realizations and further developments is possible if it is sensible. Other possible realizations, further developments and implementations of the invention also comprise those combinations of inventive features described above or below with respect to the exemplary embodiments which are not explicitly mentioned, wherein, in particular, a person having ordinary skill in the art will also add individual aspects, as improvements or supplements, to the respective basic form of the present invention.

BRIEF DESCRIPTION OF THE DRAWINGS

In the following, the present invention will be explained in greater detail on the basis of the exemplary embodiments indicated in the schematic figures of the drawings, wherein FIG. 1 shows a block diagram of an embodiment of an inventive mirror substitute device;

FIG. 2 shows a block diagram of an embodiment of an inventive vehicle; and

FIG. 3 shows a block diagram of a further embodiment of an inventive mirror substitute device.

In all figures, similar elements and devices/elements and devices having similar functions are denoted by the same reference numerals unless indicated otherwise:

DETAILED DESCRIPTION OF EMBODIMENTS
OF THE INVENTION

FIG. 1 shows a block diagram of an embodiment of an inventive mirror substitute device 1.

The mirror substitute device 1 of FIG. 1 has a camera 3-0 that may be arranged, e.g., on a vehicle 2. The camera supplies an image signal 4 that is transmitted to an image processing device 5.

The image processing device 5 processes the image by means of various image processing functions and outputs a processed image signal 6 that is displayed on a display device 7-0. FIG. 1 shows only a single display device 7-0. In further embodiments, further display devices 7-1-7-3 may be present.

The display device 7-0 may be any desired type of display. For example, the display device 7-0 may be designed as an LCD screen, an OLED screen or the like, wherein the processed image signal 6 may be transmitted to the display device 7-0 in an analog manner or in a digital manner. In one embodiment, the processed image signal 6 may be transmitted to the display device 7-0 without using a cable.

Any desired type of sensor capable of acquiring images of the surroundings of the vehicle 2 may be used as the camera 3-0 in the inventive mirror substitute device 1. For example, the camera 3-0 may be designed as a digital CCD camera or the like. The mirror substitute device 1 of FIG. 1 has only a single camera 3-0. In further embodiments, further cameras 3-1-3-3 may be present.

The image processing device 5 may be a program-controlled device 5, e.g., a microcontroller 5 or the like. The image processing device 5 may also have program modules that implement the below-described functionalities in the respective program-controlled device 5.

In one embodiment, the image processing device 5 may be integrated in the camera 3-0 or one of the cameras 3-1-3-3. Alternatively, the image processing device 5 may be integrated in the display device 7-0 or one of the further display devices 7-1-7-3.

In a further embodiment, the image processing device 5 may be designed as parts of a vehicle system 12 that is already present in the vehicle 2. In such an embodiment, the image processing device 5 may be designed as, e.g., a program module in a vehicle system 12 that additionally has further functions. In one embodiment, this vehicle system 12 may have, e.g., a multitasking operating system, particularly an AUTOSAR-compatible operating system.

FIG. 2 shows a block diagram of an embodiment of an inventive vehicle 2.

The vehicle 2 has three cameras 3-1-3-3, wherein a camera 3-1 is fastened in that position in which the left lateral rear view mirror is usually fastened to a vehicle 2. The camera 3-2 is fastened in that position in which the right lateral rear view mirror is usually fastened to a vehicle 2. Accordingly, the first camera 3-1 covers the left lateral region of the surroundings 8-1 of the vehicle 2 and the second camera 3-2 covers the right lateral region of the surroundings 8-2 of the vehicle 2.

Finally, the third camera 3-3 is fastened to the tail of the vehicle such that it can cover the region behind the vehicle 2, i.e., the rear region of the surroundings 9 of the vehicle 2. For example, the third camera 3-3 may be arranged on the trunk lid of the vehicle 2 or behind the rear window of the vehicle 2.

FIG. 2 clearly shows how each of the individual cameras 3-1-3-3 covers a different image segment. However, these image segments complement each other. Accordingly, each of the individual cameras 3-1-3-3 supplies a different camera image signal 10-1-10-3, said camera image signals forming a composite image signal 4. In one embodiment, a device may be provided for the purpose of said composition or the image processing device 5 may be designed for that purpose so that the individual camera image signals 10-1-10-3, which are different from each other, are composed such that an image signal 4 is formed that exhibits a coherent image of the covered surroundings of the vehicle.

Furthermore, FIG. 2 clearly shows that the individual cameras 3-1-3-3 may be designed differently or may be adjusted by means of different optical filters/lenses such that they cover image segments that have, e.g., different widths.

In a further embodiment, further cameras may be provided that cover further regions of the surroundings of the vehicle 2.

FIG. 2 does not show the respective display devices 7-0-7-3. They may be arranged in any desired position in the vehicle 2. In particular, only one display device 7-0 may be provided or a plurality of display devices 7-0-7-3 may be provided.

For example, the display devices 7-0-7-3 may be arranged in those positions in the vehicle 2 in which the lateral rear view mirrors/inside rear view mirrors are usually arranged. The display devices 7-0-7-3 may also be arranged in other positions in the vehicle 2. For example, one of the display devices 7-0-7-3 may be arranged in the center console of the vehicle 2. In particular, one of the display devices 7-0-7-3 may be a display of an infotainment system of the vehicle 2.

FIG. 3 shows a block diagram of a further embodiment of an inventive mirror substitute device 1.

The mirror substitute device 1 of FIG. 3 is based on the mirror substitute device 1 of FIG. 1. In contrast to FIG. 1, the mirror substitute device 1 of FIG. 3 has three cameras 3-1-3-3, each of them outputting a camera image signal 10-1-10-3. Said camera image signals 10-1-10-3 are composed such that a composite image signal 4 is formed that is transmitted to the image processing device 5. Furthermore, three display devices 7-1-7-3 are coupled to the image processing device 5. The first display device 7-1 shows an image detail 15-1 showing the curbstone next to the vehicle 2, and the second display device 7-2 shows an image detail 15-2 showing the region behind the vehicle 2 where two objects 19-1 and 19-2 are present, wherein the first object 19-1 is boxed in by a dashed line.

FIG. 3 shows that an own processed image signal 6 may be transmitted to each display device 7-1-7-3 in further embodiments, which own processed image signal 6 is then displayed by the respective display device.

Furthermore, the image processing device 5 differs from the image processing device 5 of FIG. 1 in that the image processing device 5 has a communication interface 11. By means of said communication interface 11, the image processing device 5 may be coupled to a vehicle system 12 from which the image processing device 5 obtains data 13. Said data 13 may exhibit, e.g., the direction of motion of the vehicle 2 and the speed of the vehicle. Alternatively, the image processing device 5 may calculate said data 13 from the image signal 4.

The communication interface 11 transmits said data 13 to a selection device 14 that selects, inter alia on the basis of said data 13, an image detail 15-1, 15-2 from the image signal 4, wherein attention should be paid to the fact that the selected image details 15-1, 15-2 do not have to correspond to the individual camera image signals 10-1-10-3 but may be any desired regions selected from the image signal 4. In particular, in one embodiment, the selection device 14 is designed to simultaneously select several image details 15-1, 15-2.

When the vehicle 2 is moving forward, the selection device 14 may select, e.g., those image details 15-1, 15-2 from the image signal 4 which are usually shown by the inside rear view mirrors or the lateral rear view mirrors of the vehicle 2.

By contrast, when the vehicle 2 is moving backward, the selection device 14 may select, e.g., an image detail 15-1, 15-2 that shows the ground/the curbstone in the surroundings of the vehicle 2. In one embodiment, the selection device 14 may mark (e.g., by coloring or boxing in) the curbstone/the region on the ground around the vehicle 2, thereby being able to better indicate to the driver how close he or she is to the curbstone and thus to prevent the rims of the vehicle 2 from being scratched when, e.g., the driver gets into a parking space.

When the vehicle 2 is moving backward, the selection device 14 may show, e.g., the curbstone next to the vehicle 2 in a display device 7-1-7-3 arranged in the center console of the vehicle 2 and show the rear region of the surroundings 9 of the vehicle 2 in a display device 7-1-7-3 arranged in the position of the inside rear view mirror in the vehicle 2. In principle, the selection device 14 may select any desired image details 15-1, 15-2 simultaneously and display them on the different display devices 7-1-7-3.

In a further embodiment, the selection device 14 is designed to compensate for a tilt of the vehicle 2. For example, the selection device 14 may select an image detail 15-1, 15-2 that shows the road behind the vehicle 2 when the vehicle 2 is loaded/when the vehicle 2 is moving uphill or downhill. In contrast to usual mirrors that show only the road immediately behind the vehicle 2 or the sky in such a case, the driver can thus observe the road behind the vehicle 2 all the time. In a further embodiment, the selection device 14 may select, even when the vehicle 2 is cornering, the image detail such that the road behind the vehicle 2 is visible.

In still another embodiment, the selection device 14 may select an image detail 15-1, 15-2 that corresponds to the blind spot of the vehicle 2. In particular, the selection device 14 may combine this image detail showing the blind spot with further image details 15-1, 15-2 by attaching the blind spot (e.g., in the form of a distorted representation) to the further image detail 15-1, 15-2.

In one embodiment, the selection device may select an image detail 15-1, 15-2 by zooming/enlarging, wherein the image detail 15-1, 15-2 shown may be changed as required for example. For example, the image may be zoomed in on a special visual range manually or automatically, e.g., when the vehicle is standing or moving slowly, in order to, e.g., be able to see relevant objects 19-1, 19-2 better. Alternatively, the driver may adjust (e.g., enlarge or reduce) the rear visual range manually.

In a further embodiment, the respective image segment may be selected automatically. In a further embodiment, an input device may be provided, by means of which the driver or another occupant of the vehicle 2 can select an image detail 15-1, 15-2 to be displayed.

The image processing device 5 of FIG. 3 further has an image editing device 17 arranged upstream of the selection device 14. In one embodiment, the image editing device 17 may change the brightness of at least one detail of the image signal 4. For example, the image editing device 17 may normalize the image, i.e., darken very bright regions and brighten very dark regions. For example, it is also possible that the image processing device 5 only darkens very bright regions in the image signal 4 or only brightens very dark regions. For example, headlights of other vehicles or the sun may be cut out or dimmed individually.

In a further embodiment, the image editing device 17 may change (increase, in particular) the contrast of the image signal 4 so that the visibility of objects 19-1, 19-2 or environmental conditions is enhanced for the driver so that the driver has a better view of them.

In a further embodiment, the image editing device 17 may change the coloration of at least one detail of the image signal 4.

In a further embodiment, the image editing device 17 may stabilize the contents of the image signal 4, whereby it is possible to prevent the image shown by the display devices 7-1-7-3 from trembling/shaking.

An object detection device 18 is arranged downstream of the selection device 14, said object detection device 18 being capable of detecting and marking objects 19-1, 19-2 in the processed image signal 6, wherein the objects 19-1, 19-2 may be marked by highlighting in a particular color, by boxing in, by zooming in on the object or by a representation in an overlay, by a combination of the above-mentioned possibilities, or the like.

Finally, the image processing device 5 has a calculating device 20 capable of generating a warning signal 21 on the basis of the image signal 4 if necessary. For example, the calculating device 20 may have a lane change assistance system that outputs, in the event of a lane departure of the vehicle 2, a warning signal when there is another vehicle approaching from behind. The calculating device 20 may also implement a so-called rim protection function. For this purpose, a warning signal 21 is outputted when the driver is moving the vehicle 2 so close to the curbstone that a rim of the vehicle 2 could be scratched. For example, the calculating device 20 may also generate a warning signal 21 when an object 19-1, 19-2 is in the blind spot of the vehicle 2.

Finally, the image processing device 5 has a storage device 22 capable of storing the image signal 4, wherein the storage device 22 may be designed as any desired type of storage, e.g., as a flash memory, a hard-disk storage, or the like.

The present invention has been described above on the basis of preferred exemplary embodiments. However, the invention is not limited thereto but may be modified in a wide variety of ways. In particular, the invention may be altered or modified in a wide variety of ways without departing from the core of the invention.

For example, in the embodiment of FIG. 3, individual components may be removed or the position/arrangement of the individual components may be altered.

REFERENCE NUMERALS 1 mirror substitute device
2 vehicle
3-0-3-3 camera
4 image signal
5 image processing device
6 processed image signal
7-0-7-3 display device
8-1-8-2 lateral region of the surroundings
9 rear region of the surroundings
10-1-10-3 camera image signals
11 communication interface
12 vehicle system
13 data
14 selection device
15-1-15-2 image detail
17 image editing device
18 object detection device
19-1-19-2 objects
20 calculating device
21 warning signal
22 storage device

The invention claimed is:

1. A mirror substitute device for a vehicle, comprising:
at least one camera configured and arranged to monitor at least a part of surroundings of a vehicle and to provide a corresponding initial image signal;
an image processing device coupled to the at least one camera and configured to process the initial image signal and to output a processed image signal,
wherein the image processing device has a selection device configured to automatically select and/or mark a first image detail as a portion from the initial image signal in response to a trigger condition, and to output the first image detail as the processed image signal,
wherein the trigger condition is that the vehicle is moving backward at a speed below a first speed threshold value,
wherein the first image detail shows the ground and/or the curbstone in the surroundings behind the vehicle, and
wherein the image processing device is configured to obtain motion data about a forward or backward motion of the vehicle and about the speed of the vehicle to determine the trigger condition by determining whether the vehicle is moving backward and whether the speed of the vehicle is below the first speed threshold value; and at least one display device configured and arranged to display the first image detail from the processed image signal.

2. The mirror substitute device according to claim 1, wherein the at least one camera is configured and arranged to monitor at least the lateral and/or rear regions of the surroundings of the vehicle.

3. The mirror substitute device according to claim 1, wherein the at least one camera includes a plurality of cameras configured to produce respective camera image signals that complement each other and are combined to form the initial image signal.

4. The mirror substitute device according to claim 1, wherein the image processing device has a communication interface which is configured to obtain the motion data from a vehicle system of the vehicle.

5. The mirror substitute device according to claim 1, wherein the selection device is configured to select, when the vehicle is moving forward, a second image detail that approximately corresponds to a theoretical image theoretically shown by an inside rear view mirror and/or lateral rear view mirror in the vehicle.

6. The mirror substitute device according to claim 1,
wherein the at least one camera is configured and arranged to monitor a blind spot of the vehicle; and
wherein the selection device is configured to select, under a specified condition, a further image detail which corresponds to the blind spot of the vehicle.

7. The mirror substitute device according to claim 1, wherein the selection device is configured to select, when the vehicle is loaded and/or is cornering and/or is moving uphill or downhill, another image detail that shows a road behind the vehicle.

8. The mirror substitute device according to claim 1, wherein the selection device is configured to select more than one said image detail and to combine the selected image details in the processed image signal; and/or the selection device is configured to enlarge the image detail.

9. The mirror substitute device according to claim 1, wherein the image processing device has an image editing device configured to:
change, particularly to normalize, a brightness of at least one detail of the initial image signal; and/or
change, particularly to increase, a contrast of at least one detail of the initial image signal; and/or
change a coloration of at least one detail of the initial image signal; and/or
stabilize contents of the initial image signal.

10. The mirror substitute device according to claim 1,
wherein the image processing device has an object detection device configured to detect objects in the initial image signal and/or in the processed image signal and to mark at least one detected object in the initial image signal; and
wherein the object detection device is configured to mark an object by boxing the object and/or coloring the object with a predetermined color and/or zooming in on the object.

11. The mirror substitute device according to claim 1, wherein the image processing device has a calculating device configured to generate a warning signal based on the initial image signal when the vehicle is on a point of deviating from a traffic lane and/or when an object is in a blind spot of the vehicle and/or when an object is approaching the vehicle from behind.

12. The mirror substitute device according to claim 1, wherein the image processing device has a storage device configured to store the initial image signal.

13. A vehicle comprising a mirror substitute device according to claim 1 mounted on a vehicle body.

14. The vehicle according to claim 13, wherein the vehicle includes no inside rear view mirror, no left lateral rear view mirror, and no right lateral rear view mirror.

* * * * *